United States Patent
Hu

(10) Patent No.: US 7,228,487 B2
(45) Date of Patent: Jun. 5, 2007

(54) DATA BUFFERING SYSTEM AND METHOD FOR OPTICAL RECORDING DEVICE

(75) Inventor: Shao-chueh Hu, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 512 days.

(21) Appl. No.: 10/453,620

(22) Filed: Jun. 4, 2003

(65) Prior Publication Data

US 2004/0083418 A1    Apr. 29, 2004

(30) Foreign Application Priority Data

Oct. 24, 2002   (TW) ............................... 91124654 A

(51) Int. Cl.
*G11C 29/00*    (2006.01)
*H03M 13/00*    (2006.01)

(52) U.S. Cl. ...................... 714/769; 714/756

(58) Field of Classification Search ............... 714/769, 714/756

See application file for complete search history.

(56) References Cited

U.S. PATENT DOCUMENTS

| | | | | |
|---|---|---|---|---|
| 5,189,237 A | * | 2/1993 | Koguchi ...................... 84/609 |
| 5,563,862 A | * | 10/1996 | Udagawa .................. 369/53.24 |
| 5,805,537 A | * | 9/1998 | Yamamoto et al. .... 369/124.09 |
| 5,917,836 A | * | 6/1999 | Ichikawa et al. ............ 714/755 |
| 5,970,031 A | * | 10/1999 | Huang et al. ............. 369/44.28 |
| 6,058,453 A | * | 5/2000 | Packer ........................ 711/112 |
| 6,064,634 A | * | 5/2000 | Packer ..................... 369/30.25 |
| 6,229,769 B1 | * | 5/2001 | Packer ........................ 714/769 |
| 6,373,794 B2 | * | 4/2002 | Packer ..................... 369/30.23 |
| 6,401,228 B1 | * | 6/2002 | Ichikawa et al. ........... 714/755 |
| 6,574,423 B1 | * | 6/2003 | Oshima et al. .............. 386/111 |
| 6,877,126 B2 | * | 4/2005 | Hall et al. ................... 714/769 |
| 2001/0002894 A1 | * | 6/2001 | Packer ..................... 369/59.26 |

* cited by examiner

*Primary Examiner*—Joseph D. Torres
(74) *Attorney, Agent, or Firm*—Troxell Law Office, PLLC

(57) ABSTRACT

The present invention is a data buffering system for buffering information from an optical recording medium into a buffer memory. The information comprises a main data and a subcode. The system comprises a main target comparator, a correction target comparator and a transfer/buffer module. The main target comparator selects a start main data frame of the main data, and triggers a main data transferring procedure when detecting the start main data frame. The correction target comparator gets a correction main data frame by adding an additional value to the start main data frame, and trigger a subcode transferring procedure when detecting the correction main data frame. The transfer/buffer module transfers and buffers the subcode to the buffer memory and the main data according to the subcode transferring procedure and the main data transferring procedure, respectively.

18 Claims, 8 Drawing Sheets

DATA BUFFERING SYSTEM AND METHOD FOR OPTICAL RECORDING DEVICE

BACKGROUND OF THE INVENTION

1. Field of the Invention

The present invention relates to a data buffering system and a method, and more particularly, to a data buffering system and a method for an optical recording device.

2. Description of the Prior Art

An optical recording medium, such as audio compact disc (CD) and video CD, is for recording data. To use the data recorded in the optical recording medium, an optical reading/recording device is used with a data buffering procedure. The procedure is to read the data of the optical recording medium and to record the data into a buffer memory of the optical reading/recording device. And then a host reads and uses the buffered data from the buffer memory.

Referring to FIG. 1, FIG. 1 shows a data reading procedure of a data file in a conventional optical recording medium 10. The optical recording medium 10 can be a video CD. The optical recording medium 10 comprises a plurality of frames 12. Each of the frames 12 comprises a 1-byte subcode 14 and two 12-bytes main data 16a, 16b. There is a 4-bytes parity 18a between the main data frames 16a, 16b, and a 4-bytes parity 18b behind the main data frames 16a, 16b. Conventionally, before the optical reading/recording device receives an instruction from the computer host to read the data files of the optical recording medium 10, a microprocessor of the optical reading/recording device will read the frames 12 of the optical recording medium 10 first, designated as (a) in FIG. 1.

Next, the microprocessor of the optical reading/recording device diagnoses every frame 12, designated as (b). The diagnose procedure is first to diagnose two main data 16a and 16b of each of the frames one by one by using the parities, and then to combine two main data 16a and 16b into a 24-bytes main data 16.

After processing 98 frames, the microprocessor combines 98 frames 12 that have been diagnosed to become a block 20, designated as (c) in FIG. 1. Each of the 98 subcodes is combined into a subcode frame 22, and each of the 98 main data is combined into a main data frame 24. Every data file of the optical recording medium comprises a plurality of blocks 20 sequentially arranged. Each of the blocks 20 comprises a subcode frame 22 and a main data frame 24. The optical reading/recording device sequentially reads the data files of the blocks 20 of the optical recording medium 10.

As shown in FIG. 1, each of the data files of the optical recording medium 10 comprises a plurality of blocks 20 sequentially arranged. The main data frames 24 record the data files. Each of the blocks 20 comprises a subcode frame 22 and a main data frame 24. The subcode frames 22 record the address information and the data file information of the blocks 20, such as serial number, time, . . . etc of the data.

Referring to FIG. 2 and FIG. 3, FIG. 2 is a schematic diagram of a data buffering system 30 in the conventional optical reading/recording device. FIG. 3 is a schematic diagram of a main data stream A and a subcode stream B with time sequence read by the reading module 32 shown in FIG. 2. After the optical reading/recording device reads each of the blocks 20, input each of the blocks 20 sequentially to the data buffering system 30 to be used by the computer host.

As shown in FIG. 2, the conventional data buffering system 30 comprises a reading module 32, a transferring module of the main data 34, a transferring module of the subcodes 36, a target comparator 38, a transferring module 40, a buffer memory 42, and a microprocessor 44. The reading module 32 is used to execute the data reading procedure mentioned above, and to read the main data frames 22 and the subcode frames 24 of the sequentially arranged blocks 20 as a main data stream A and a subcode stream B, respectively (shown in FIG. 3). Each of the main data frames 22 and the subcode frames 24 has a frame code for identification. The frame codes are usually represented as minute/second/frame(MSF).

The transferring module of the main data 34 is used to transfer the main data recorded in each of the main data frames of the main data stream to the transferring module 40 in the FIFO (first in first out) sequence. The transferring module of the subcodes 36 is used to transfer the subcodes recorded in each of the subcode frames of the subcode stream to the transferring module 40 in the FIFO sequence.

The target comparator 38 inputs a target MSF of the main data from the microprocessor 44. The target MSF of the main data is a corresponding MSF of the start main data, and used to be the initial point when the transferring module 40 begins to transfer and buffer. When the target comparator 38 detects that the corresponding main data frames of the target MSF of the main data input into the transferring module 40, trigger a transferring procedure to transfer and buffer the data of the main data frames and the subcode frames that input in the transferring module 40 in the meantime into a corresponding recording unit of the buffer memory 42.

However, the main data frames and the subcode frames in the same data block will not be inputted into the transferring module 40 in the meantime, because the time needed for the reading module 32 to read the subcode frames 22 and the main data frames 24 are different. According to the prior art, because the data amount of the main data is higher and the diagnosing procedure is needed for the main data, the latency of the main data stream is more than that of the subcode stream about 1~3 blocks. As shown in FIG. 3, in the main data stream A and the subcode stream B, the numbers in each squares represent the MSF of the main data frames or the subcode frames. For example, 2/3/5 in the main data stream means the main data recorded in the main data frames of 2/3/5.

As shown in FIG. 3, when the main data frames and the subcode frames of the same data block have the same MSF, then in the same time sequence, the main data stream A delays three more data blocks in comparison with the subcode stream B. Therefore, if the microprocessor 44 sets the target data blocks from 2/3/5 to 2/3/9, the transferring module will transfer the main data that recorded in the main data frames from 2/3/5 to 2/3/9 of the main data stream A, and the subcode which are inputted into the transferring module 40 in the meantime (T1 and T2) which are the subcode frames from 2/3/8 to 2/3/12 of the subcode stream B. Therefore, the same recording unit in the buffer memory 42 will record the data from the main data frame of 2/3/5 and in the subcode frame of 2/3/8, but not data from the main data frame of 2/3/5 and the subcode frame of 2/3/5 in the same data block.

In order to solve the problem that the main data and the subcode of the same recording unit belong to different block, the U.S. Pat. No. 6,058,453 provides a method for synchronous transferring the main data and the subcode. According to the U.S. Pat. No. 6,058,453, a target module of the subcode is added into the conventional data buffering system, so that the transferring module can transfer and buffer the main data frames and the subcode frames with the same MSF to the same recording unit.

There is a disadvantage of this method. Because it is not to buffer the main data frames and the subcode frames of the same data block into the same recording unit, but to buffer the main data frames and the subcode frames with the same MSF into the same recording unit. If the MSF of the main data and the MSF of the subcodes of the same data block are the same, then this method can achieve the objective to record the main data frames and the subcodes frames of the same data block to the same recording unit. However, for some reason, the MSF of the main data frames and the MSF of the subcode frames sometimes are not the same, in such situation the method disclosed in the U.S. Pat. No. 6,058,453 can no longer record the main data frames and the subcode frames of the same data block into the same recording unit.

SUMMARY OF THE INVENTION

It is therefore a primary objective of the present invention to provide a data buffering system and a method for transferring and buffering the data files into a buffer memory.

The data buffering system of the present invention is used to buffer a section of information from an optical recording medium to a buffer memory. The optical recording medium comprises a plurality of data blocks. Each of the data blocks comprises a subcode frame and a corresponding main data frame. The section of information is recorded in a predetermined amount of main data frames. The section of information comprises a section of main data and a section of subcodes. The buffering system comprises a main data reading module, a subcode reading module, a main target comparator, a correction target comparator, and a transfer/buffer module.

The main data reading module is used to read the data recorded in the plurality of main data frames in proper sequence. The subcode reading module is used to read the data recorded in the plurality of subcode frames in proper sequence. The main target comparator is used to select a start main data frame of the section of main data and to trigger a main data transferring procedure when detecting the start main data frame. The correction target comparator is used to add an additional value to the start main data frame in order to get a correction main data frame, and to trigger a subcode transferring procedure when detecting the correction main data frame. The transfer/buffer module is used to transfer and buffer the section of subcode to the buffer memory according to the subcode transferring procedure. The transfer/buffer module is also used to transfer and buffer the section of main data to the buffer memory according to the main data transferring procedure.

The data that recorded in the main data frames has been applied with a process of Cross interleaved Reed-Solomon Code (CIRC). Therefore, the additional value is determined by the latency that produced by applying the process of CIRC to the main data frames. The determined additional value makes the time sequence of the subcode transferring procedure earlier than the time sequence of the main data transferring procedure, in order to compensate the CIRC latency and make the subcode frames and the corresponding main data frames of the same data block to transfer and buffer into the same recording unit of the buffer memory.

The advantage of the present invention is to include the correction target comparator in the data buffering system. According to the start main data frame of the main target comparator, an additional value is added and then a correction main data frame is obtained. When the correction target comparator module detects the correction main data frame, the subcode transferring procedure will be triggered and the subcodes that are inputted in the meantime in the transferring module will be transferred. The additional value is determined by the latency between the main data frames and the subcode frames, therefore the subcode frames and the corresponding main data frames of the same data block can be transferred and buffered into the same recording unit of the buffer memory.

These and other objectives of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
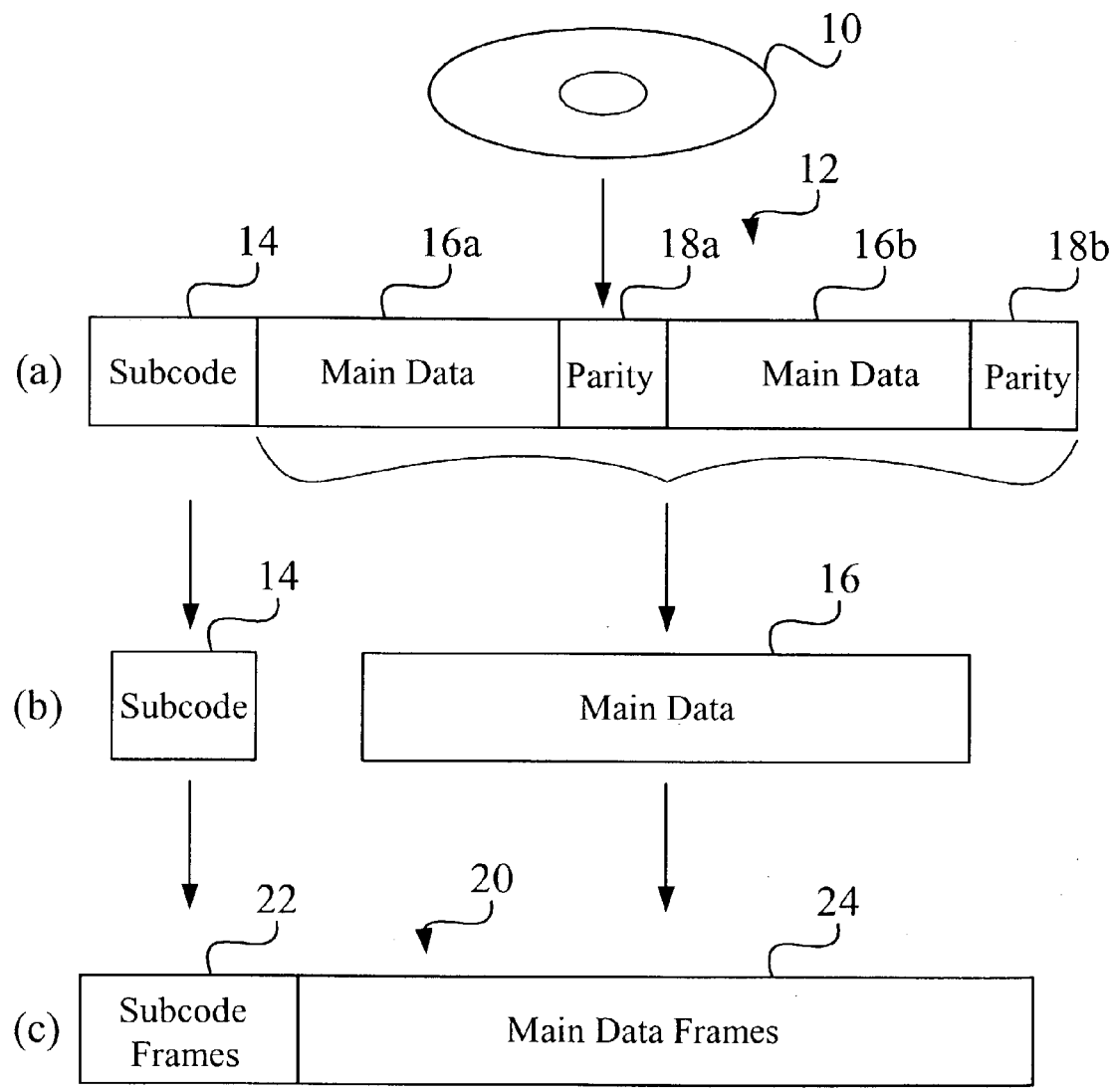
FIG. 1 is a schematic diagram of a data reading procedure of a data file in a conventional optical recording medium
Figure 2:
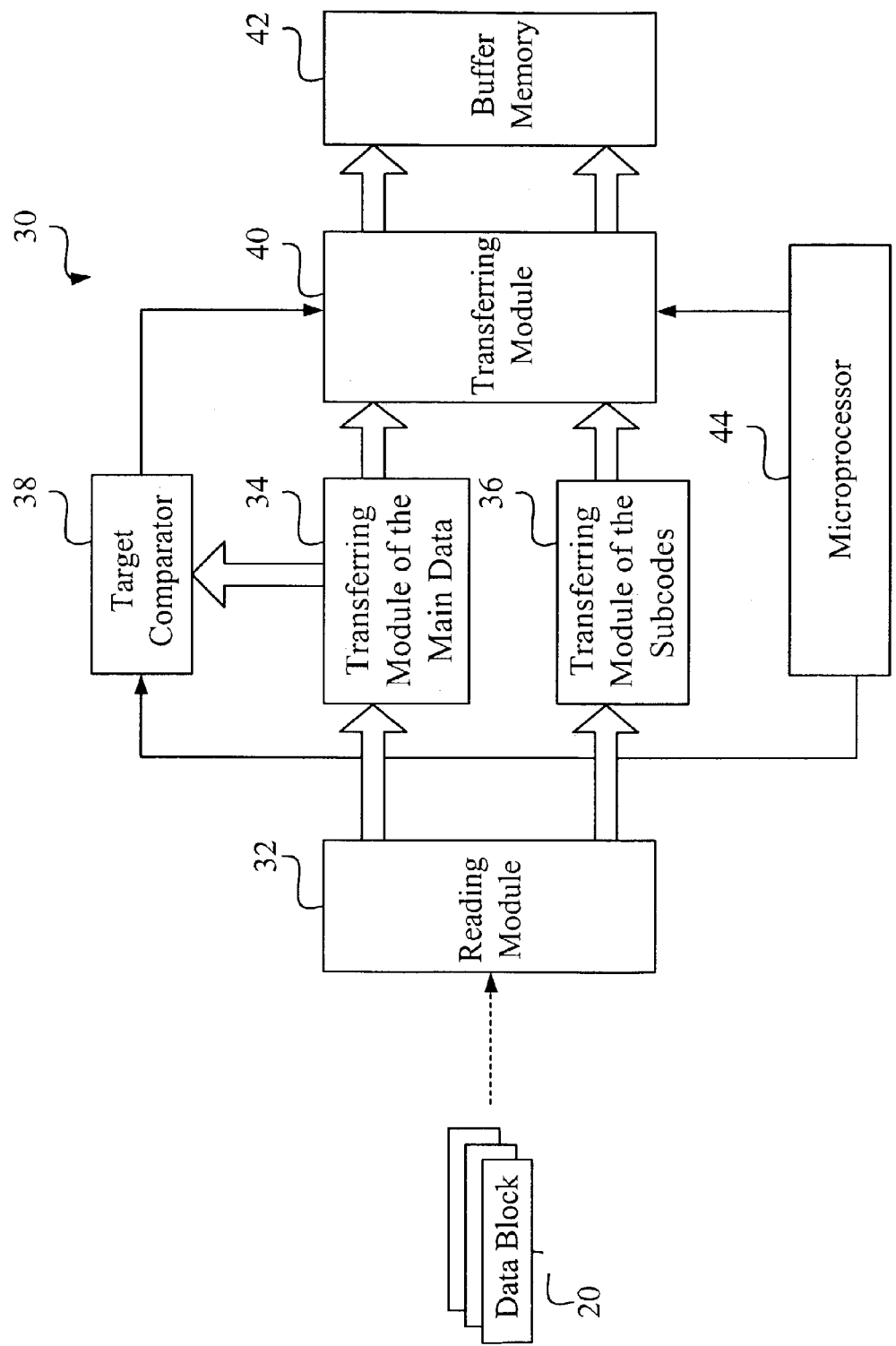
FIG. 2 is a schematic diagram of a data buffering system in the conventional optical reading/recording device.
Figure 3:
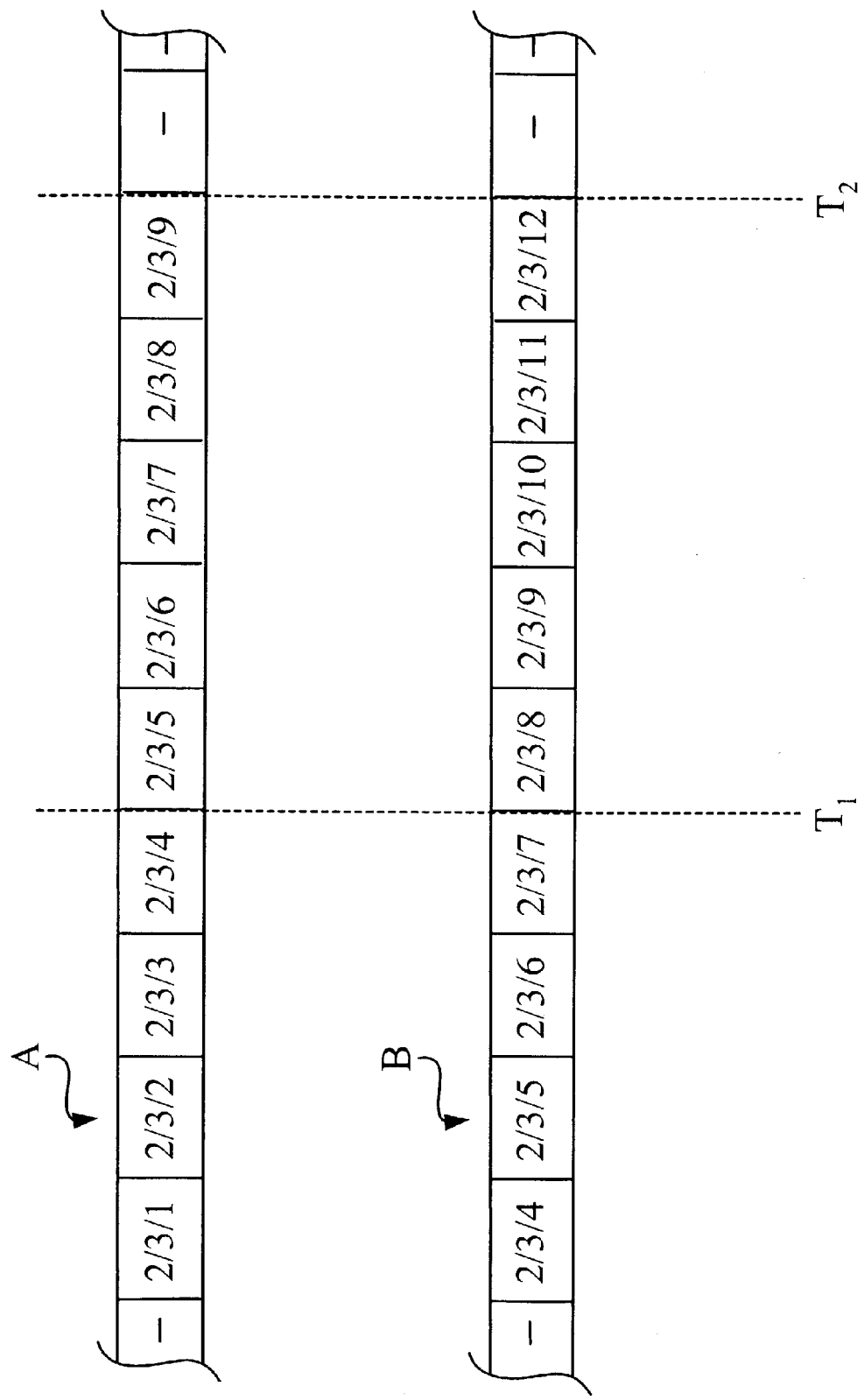
FIG. 3 is a schematic diagram of a main data stream and a subcode stream with time sequence read by the reading module shown in FIG. 2.

The present invention provides a data buffering system for buffering a section of information from an optical recording medium to a buffer memory. The section of information described above does not mean the information recorded in a section of the optical recording medium, but means the information comprising a plurality of data that is unlimited. Regarding the optical recording medium, please refer to FIG. 1. As shown in FIG. 1, the optical recording medium 10 comprises a plurality of data blocks 20. Each of the data blocks 20 comprises a subcode frame 22 and a corresponding main data frame 24. The section of information is recorded in a predetermined amount of main data frames 24, and the section of information comprises a section of main data and a section of subcode. Each of the main data frames 24 and the subcode frames 22 are distinguished by minute/second/frame (MSF). The buffer memory comprises a plurality of recording units for buffering the data recorded in a data block 20 of the optical recording medium 10.

Figure 4:
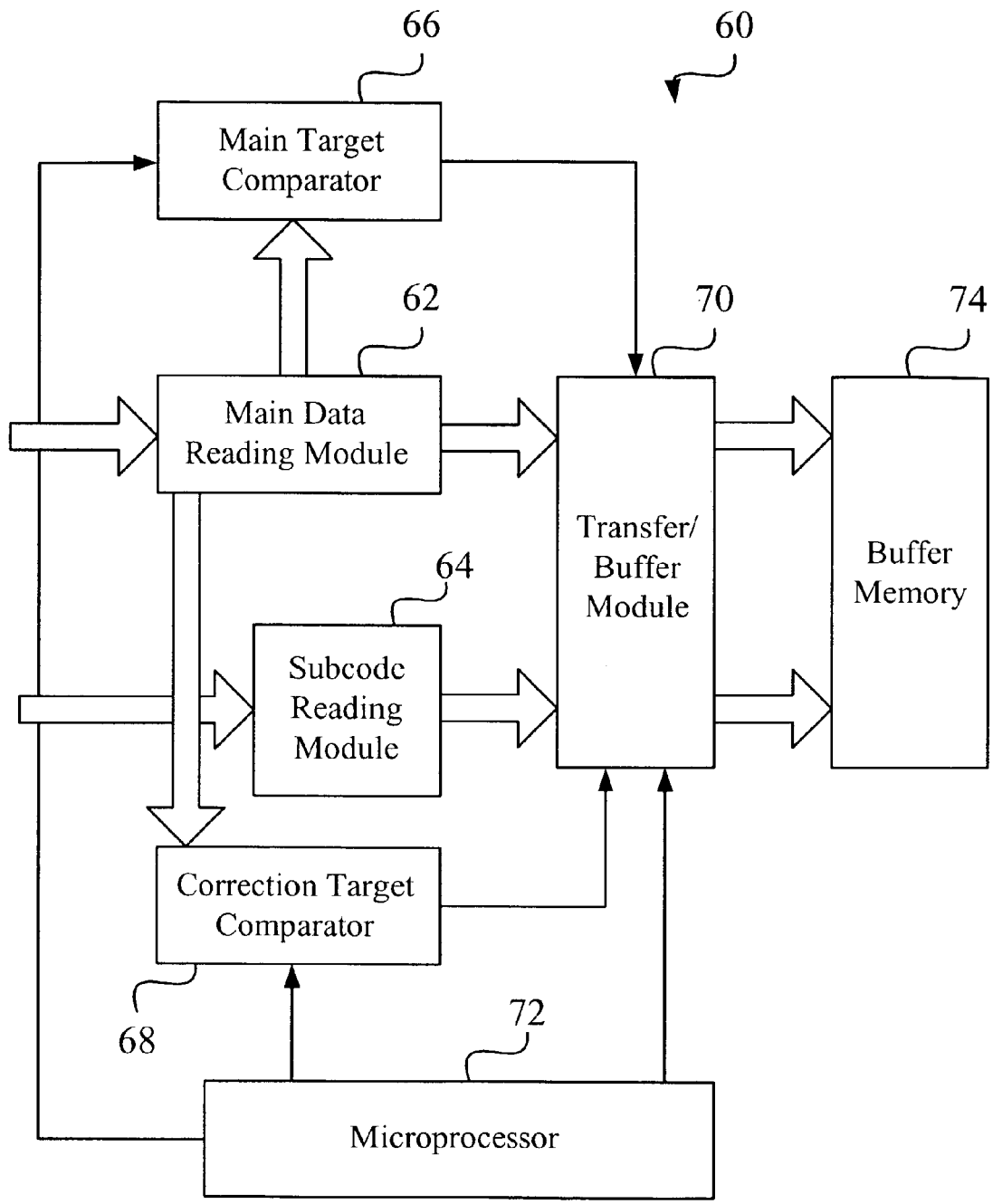
FIG. 4 is a schematic diagram of the data buffer system according to the present invention.

Referring to FIG. 4, FIG. 4 is a schematic diagram of the data buffer system 60 according to the present invention. The data buffer system 60 of the present invention comprises a main data reading module 62, a subcode reading module 64, a main target comparator 66, a correction target comparator 68, a transfer/buffer module 70, and a microprocessor 72.

The main data reading module 62 is used to read the data recorded in the main data frames 24 in proper sequence. The main data reading module 62 will transfer the data of the main data frames 24 to the transfer/buffer module 70 in the FIFO sequence. The subcode reading module 64 is used to read the data recorded in the subcode frames 22 in proper sequence. The subcode reading module 64 will transfer the data of the subcode frames 22 to the transfer/buffer module 70 in the FIFO sequence. For example, the main data reading module 62 and the subcode reading module 64 will read the data recorded in the corresponding main data frames and the corresponding subcode frames in the MSF sequence, such as 2/3/5, 2/3/6, 2/3/7 . . . .

More particularly, when using an optical reading device to read the data from the data blocks, a process of Cross Interleaved Reed-Solomon Code (CIRC) must be applied to the main data frames, because the data length of the main data frames is longer than that of the subcode frames. Therefore, the reading time sequence of the main data frames and that of the subcode frames of the same data block are different. In normal condition, the main data frames arrive behind the subcode frames of the same data block.

The main target comparator 66 will select a target MSF of the main data from the microprocessor 72. The target MSF of the main data is a corresponding MSF of the start main data frame of the section of main data. The target MSF is used to be the initial point when the transfer/buffer module 70 begins to transfer the section of main data. The main target comparator 66 will trigger a main data transferring procedure when detecting the start main data frame according to the target MSF of the main data.

The main data transferring procedure is described as followings. When detecting the start main data frame, the data of the start main data frame that are read in the meantime will be transferred and buffered to a predetermined recording unit of the buffer memory 74. Then the later data of the main data frames will be transferred and buffered to the later recording units of the predetermined recording unit, in order to finish buffering the main data to the buffer memory.

The correction target comparator 68 will select an additional value and the target MSF of the main data from the microprocessor 72. The correction target comparator 68 will add the additional value to the target MSF of the main data for obtaining a correction main data frame. When the correction target comparator 68 detects the correction main data frame, the correction target comparator 68 will trigger a subcode transferring procedure.

The subcode transferring procedure is described as followings. When detecting the correction main data frame, the data of the subcode frames that are read in the meantime will be transferred and buffered to the predetermined recording unit. Then the data of the later subcode frames will be transferred and buffered to the recording units later of the predetermined recording unit, in order to finish buffering the section of subcode to the buffer memory.

More particularly, the additional value is determined by the latency produced by applying the process of CIRC to the main data frames. The determined additional value makes the time sequence of the subcode transferring procedure earlier than the time sequence of the main data transferring procedure in order to compensate the CIRC latency of the main data frames and make the subcode frames and the corresponding main data frames of the same data block to be transferred and buffered into the same recording unit of the buffer memory.

The transfer/buffer module 70 is used to transfer and buffer the section of subcode to the buffer memory 74 according to the subcode transferring procedure, and to transfer and buffer the section of main data to the buffer memory 74 according to the main data transferring procedure. By the data buffering system 60 of the present invention, each of the data recorded in the main data frames and the corresponding subcode frames of the predetermined amount of data blocks are buffered into the same recording unit of the buffer memory 74.

Figure 5:
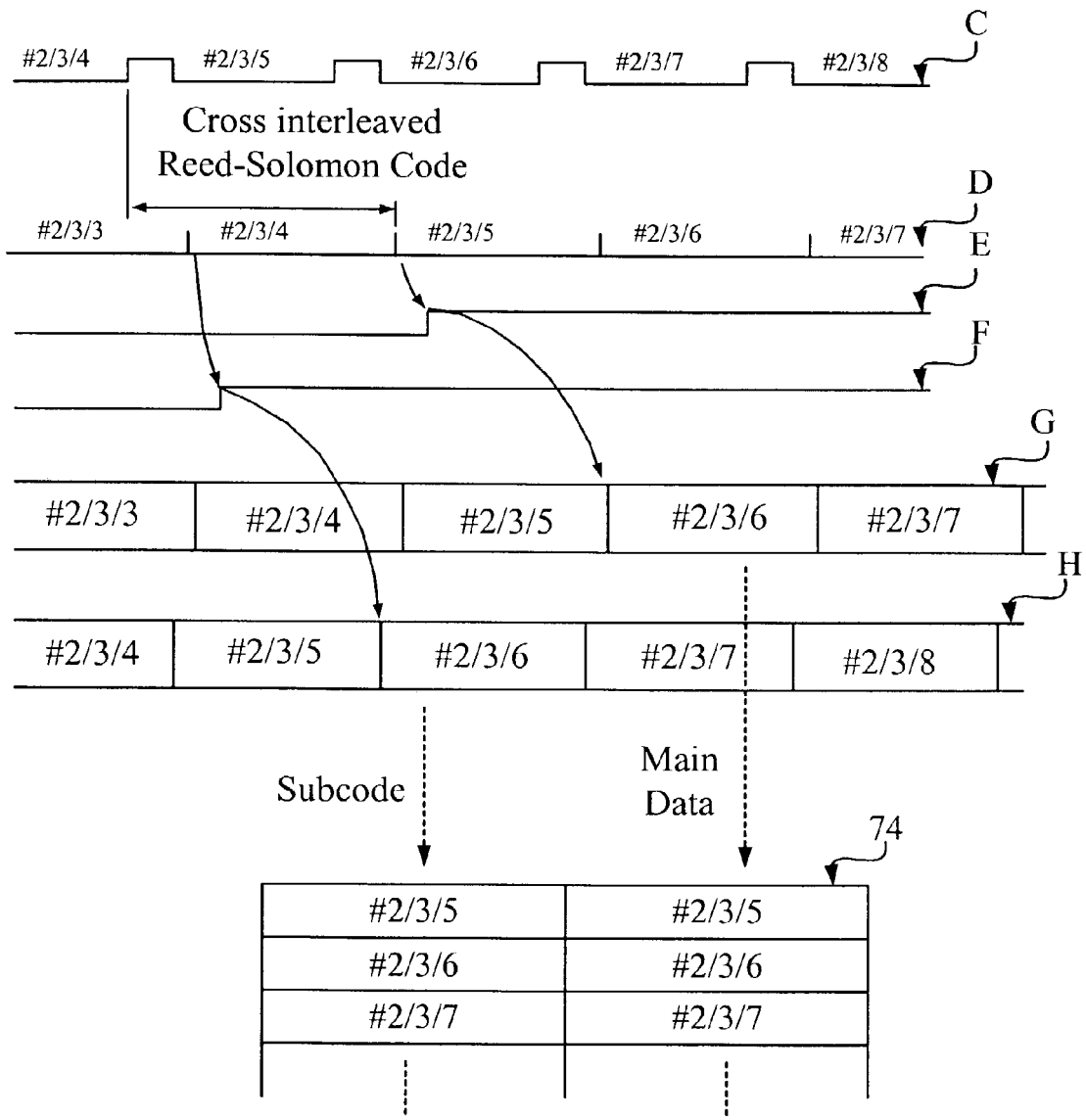
FIG. 5 is a schematic diagram of the time sequence for an embodiment of reading the data blocks by the data buffering system shown in FIG. 4.
Figure 6:
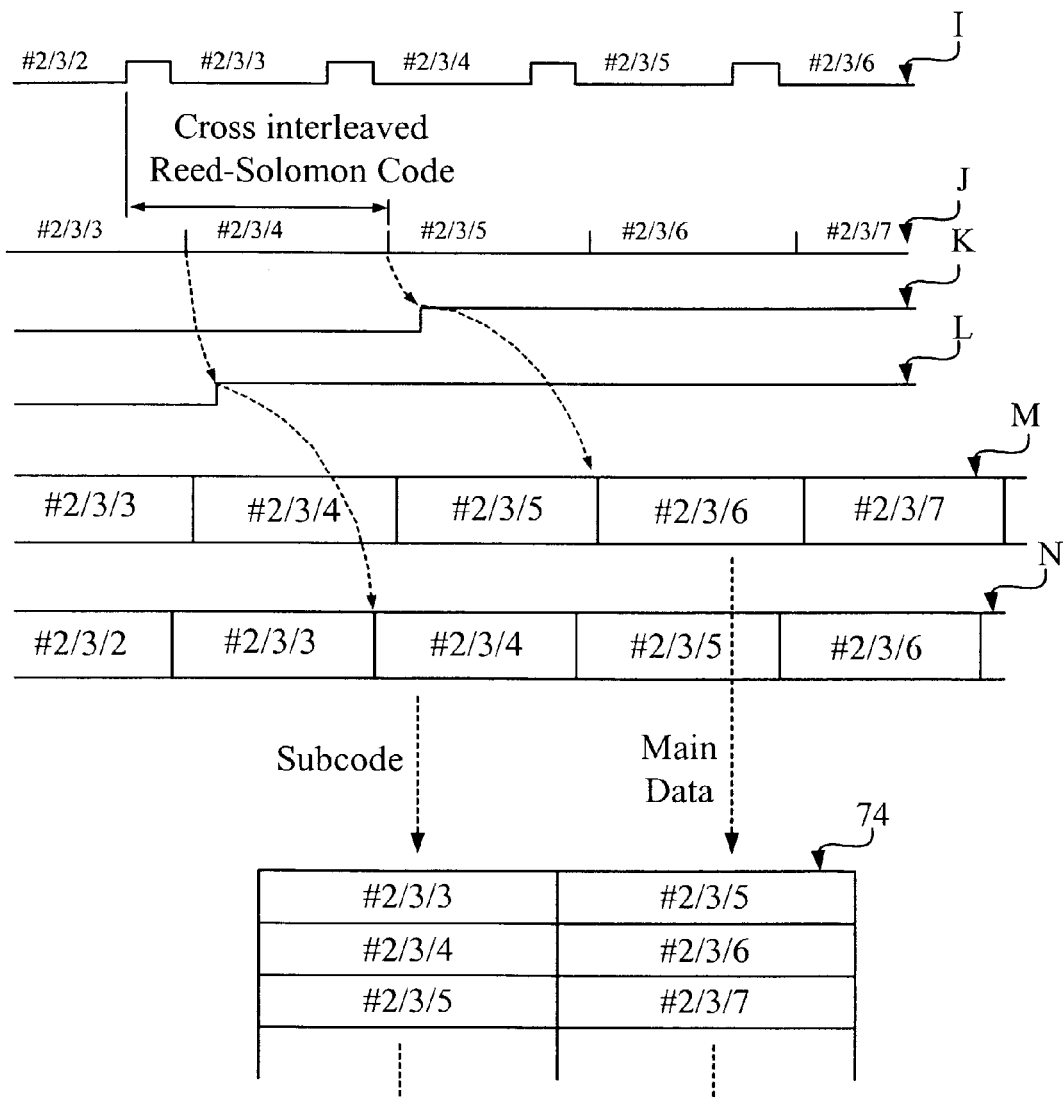
FIG. 6 is a schematic diagram of the time sequence for another embodiment of reading the data blocks by the data buffering system shown in FIG. 4.

Referring to FIG. 5 and FIG. 6, FIG. 5 is a schematic diagram of the time sequence for an embodiment of reading the data blocks by the data buffering system 60 shown in FIG. 4. FIG. 6 is a schematic diagram of the time sequence for another embodiment of reading the data blocks by the data buffering system 60 shown in FIG. 4. In the first embodiment, the main data frames and the subcode frames of the same data block have the same MSF (FIG. 5). In the second embodiment, the main data frames and the subcode frames of the same data block have different MSF (FIG. 6).

In normal condition, the main data frames and the subcode frames of the same data block have the same MSF. Because the data recorded in the main data frames has been applied the process of CIRC, the main data frames are one data block behind the subcode frames. In FIG. 5, the time sequence C represents the reading time sequence of the subcodes, and the time sequence D represents the reading time sequence of the main data. In the reading time sequences D and C, the symbol # following with numbers represent the MSF of the main data frames and the subcode frames. For example, the 2/3/5 in the reading time sequence D represents that the main data of the main data frames has the MSF of 2/3/5. In normal condition, the reading time sequence of the main data frames is one MSF behind the reading time sequence of the subcode frames. In this condition, the addition value from the microprocessor 72 can be set as −1.

Therefore, when the microprocessor 72 sets the target MSF of the main data as 2/3/6, the correction MSF of the main data is 2/3/5. As shown in FIG. 5, the time sequence E is the triggering time sequence of the main data transferring procedure, and the time sequence F is the triggering time sequence of the subcode transferring procedure. When the main target comparator 66 detects the start main data frame, the main data transferring procedure of the transfer/buffer module 70 will be triggered, to transfer and buffer the main data that are inputted to the transfer/buffer module 70 into the first recording unit of the buffer memory 74. And then the later main data recorded in the main data frames will be transferred and buffered to the later recording units.

When the correction target comparator 68 detects the correction main data frame, the subcode transferring procedure of the transfer/buffer module 70 will be triggered, to transfer and buffer the subcodes that are inputted into the transfer/buffer module 70 into the first recording unit of the buffer memory 74. Then the later subcodes recorded in the subcode frames will be transferred and buffered into the later recording units. Therefore, the main data and the subcodes of the same data block in the optical recording medium 10 will be transferred and buffered into the same recording unit of the buffer memory 74. As shown in FIG. 5, the subcode 2/3/5 and the main data 2/3/5 of the same data block will be buffered in the same recording unit.

In FIG. 5, the time sequence G shows that when the transfer/buffer module 70 transfers the main data, the main data recodred before the start main data frame are transferred and buffered into the 0th recording unit of the buffer memory, and are repeatedly wiped/written until the start main data frame is detected. Then the main data recorded in the start main data frame will be transferred and buffered into the 1st recording unit. The time sequence H in FIG. 5 shows the same way for buffering the subcode.

Referring to FIG. 6. Sometimes the main data frames and the subcode frames of the same block have different MSF, meaning that comparing to the MSF of the subcodes the MSF of the main data is in excess of 2. If the MSF of the main data frame is 2/3/5, the MSF of the subcode is 2/3/3. In FIG. 6, the time sequence I represents the reading time sequence of the subcodes, and the time sequence J represents the reading time sequence of the main data. The symbol # following with numbers represents the MSF. For example, the 2/3/5 in the reading time sequence J represents that the main data recorded in the main data frames has the MSF of 2/3/5. In normal condition, the data recorded in the main data frames has been applied with the process of CIRC, thus the main data frames delays one data block in the comparison with the subcode frames. In this condition, the additional value from the microprocessor 72 can be set as −1.

Therefore, when the microprocessor 72 sets the target MSF of the main data to 2/3/5, the correction MSF of the main data is 2/3/4. In FIG. 6, the time sequence K represents the triggering time sequence of the main data transferring procedure, and the time sequence L represents the triggering time sequence of the subcode transferring procedure. When the main target comparator 66 detects the start main data frame, the main data transferring procedure of the transfer/buffer module 70 will be triggered, and the main data that is inputted to the transfer/buffer module 70 will be transferred and buffered into the first recording unit of the buffer memory 74. Then the later main data of the main data frames will be transferred and buffered to the recording units subsequent to the first recording unit.

When the correction target comparator module 68 detects the correction main data frame, the subcode transferring procedure of the transfer/buffer module 70 will be triggered, and the subcodes inputted to the transfer/buffer module 70 will be transferred and buffered into the first recording unit of the buffer memory 74. Then the later subcode of the subcode frames will be transferred and buffered into the recording units subsequent to the first recording unit. Therefore, the data of the main data frames and the data of the subcodes frames in the same data block will be transferred and buffered into the same recording units of the buffer memory 74. As shown in FIG. 6, the subcode of 2/3/3 and the main data of 2/3/5 are recorded in the same recording unit.

In FIG. 6, the time sequence M shows that when the transferring module 70 transfers the main data, the main data recorded before the start main data frame are transferred and buffered into the 0th recording unit of the buffer memory 74, and are repeatedly wiped/written until the start main data frame is detected. Then the main data recorded in the start main data frame will be transferred and buffered into the 1st recording unit. The time sequence N in FIG. 6 shows the same way for buffering the subcode.

Figure 7:
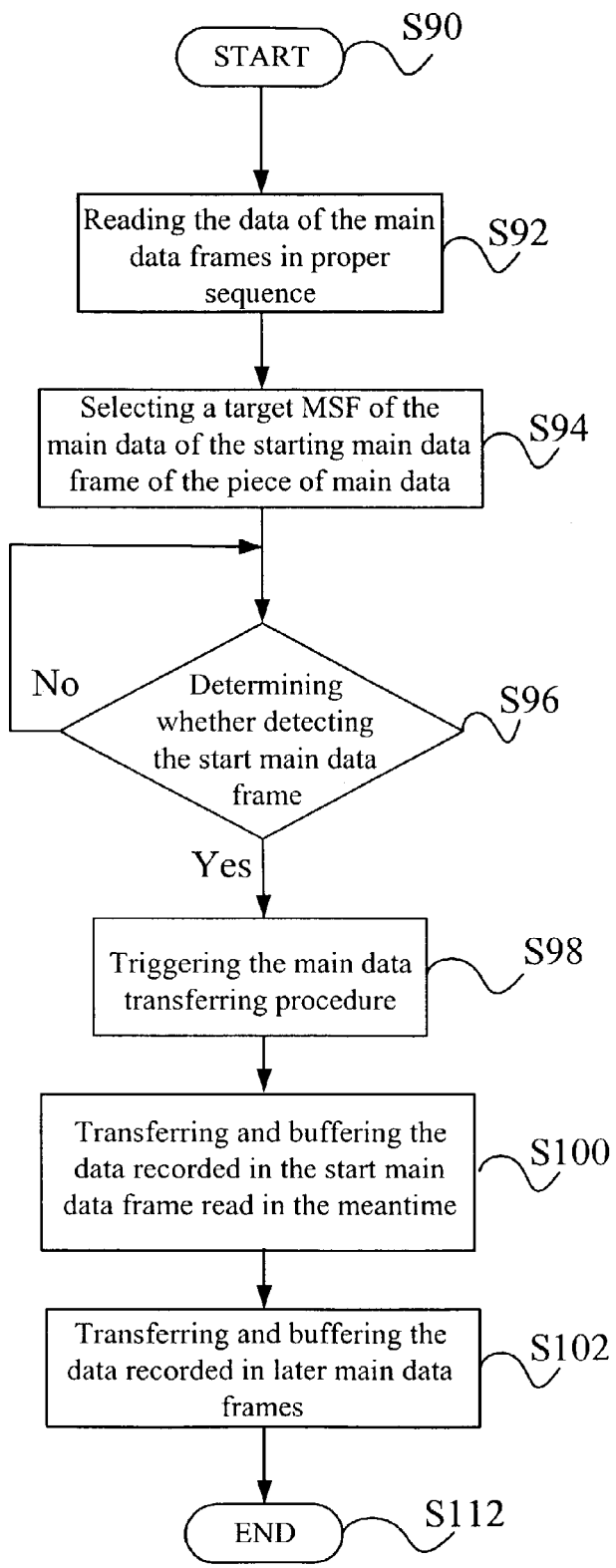
FIG. 7 is a flow chart of the data buffering method of the main data frames according to the present invention.

The followings are the procedures of the present invention. The data buffering method for the main data frames is described first. Referring to FIG. 7, FIG. 7 is a flow chart of the data buffering method of the main data frames according to the present invention. With the data buffering system 60 shown in FIG. 4, the data buffering method for the main data frames according to the present invention comprises the following steps:

Step S90: Start.

Step S92: Reading the data of the main data frames sequentially.

Step S94: Selecting a target MSF of the main data of the start main data frame of the section of main data.

Step S96: Determining whether detecting the start main data frame, if yes, go to step S98; if not, detecting continuously.

Step S98: Triggering the main data transferring procedure for transferring and buffering the section of main data to the buffer memory 74.

Step S100: Transferring and buffering the data recorded in the start main data frame that are read in the meantime into a predetermined recording unit of the buffer memory 74.

Step S102: Transferring and buffering the data recorded in later main data frames to the recording units subsequent to the predetermined recording unit, in order to finish buffering the section of main data to the buffer memory 74.

Step S104: End.

Figure 8:
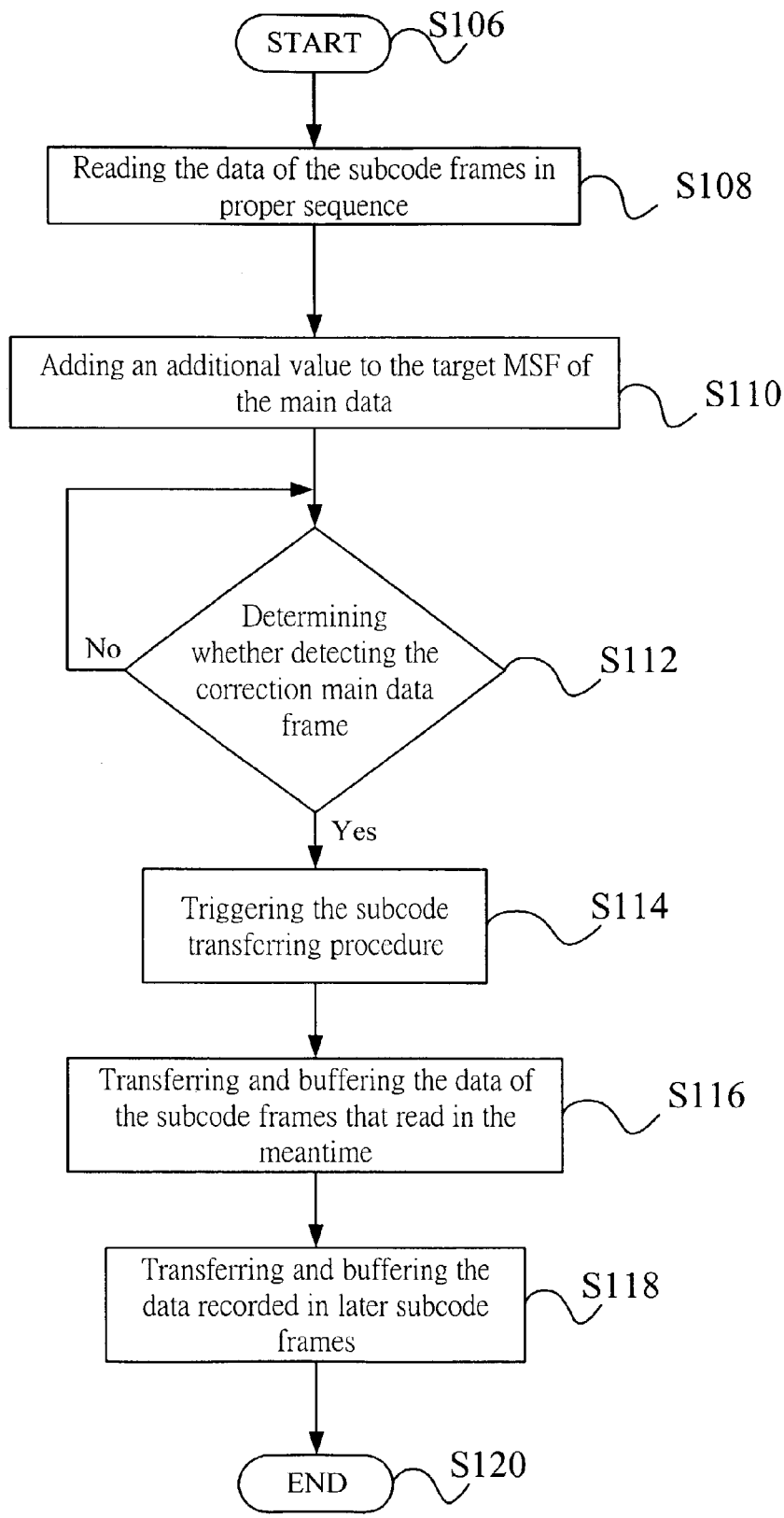
FIG. 8 is a flow chart of the data buffering method of the subcode frames according to the present invention.

Referring to FIG. 8, FIG. 8 is a flow chart of the data buffering method of the subcode frames according to the present invention. With the data buffering system 60 shown in FIG. 4, the data buffering method for the subcode frames according to the present invention comprises the following steps:

Step S106: Start.

Step S108: Reading the data of the subcode frames sequentially.

Step S110: Adding an additional value to the target MSF of the main data, in order to get a correction MSF of the main data.

Step S112: Determining whether detecting the correction main data frame, if yes, go to step S114; if not, detecting continuously.

Step S114: Triggering the subcode transferring procedure for transferring and buffering the section of subcode to the buffer memory 74.

Step S116: Transferring and buffering the data of the subcode frames that are read in the meantime into the predetermined recording unit.

Step S118: Transferring and buffering the data recorded in later subcode frames to the recording units subsequent to the predetermined recording unit, in order to finish buffering the section of subcode to the buffer memory 74.

Step S120: End.

In the data buffering method of the above mentioned embodiments, the optical reading device e.g. CD-ROM reads one data block at a time, meaning that the main data reading module 62 and the subcode reading module 64 read the main data frames and the subcode frames at the same time. Therefore both of the steps S92 and S108 proceed at the same time. Besides, in the preferred embodiment of the present invention, both of the steps S94 and S110 proceed at the same time after the steps S92 and S108. However, in another embodiment of the present invention, the steps S94 and S110 may proceed before the steps S92 and S108, meaning that the target MSF of the main data and the correction MSF of the main data can finish setting before reading the main data frames and the subcode frames.

The additional value determined by the data buffering method of the present invention will make the time sequence for triggering the subcode transferring procedure earlier than that for triggering the main data transferring procedure, in order to compensate the CIRC latency. And hence, it makes the subcode frames and the corresponding main data frames of the same data block can be transferred and buffered into the same recording unit of the buffer memory.

In the comparison with the conventional data buffering system and method, the data buffering system of the present invention comprises the correction target comparator 68 for adding an additional value according to the start main data frames set by the main target comparator 66, and obtaining a correction main data frames. When the correction target comparator 68 detects the correction main data frames, the subcode transferring procedure will be triggered, and the subcodes that are inputted in the meantime in the transferring module will be transferred and buffered. The additional value is determined by the latency between the main data frames and the subcode frames, therefore the subcode frames and the corresponding main data frames of the same data block can be transferred and buffered into the same recording unit of the buffer memory.

With the examples and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A data buffering method for buffering a section of information from an optical recording medium to a buffer memory, the optical recording medium comprising a plurality of data blocks, each data block comprising a subcode frame and a corresponding main data frame, the section of information recording in a predetermined amount of data blocks and comprising a section of main data and a section of subcode, the method comprising:
   reading the data recorded in the plurality of main data frames in proper sequence;
   reading the data recorded in the plurality of subcode frames in proper sequence;
   selecting a start main data frame of the section of main data;
   adding an additional value to the main data frame, in order to get a correction main data frame for determining when a subcode transferring procedure should be triggered;
   when detecting the correction main data frame, triggering the subcode transferring procedure for buffering the section of subcode to the buffer memory; and
   when detecting the start main data frame, triggering a main data transferring procedure for buffering the section of main data to the buffer memory.

2. The method of claim 1, wherein the start main data frame is shown as minute/second/frame (MSF).

3. The method of claim 1, wherein the buffer memory comprises a plurality of recording units for buffering data recorded in a data block of the optical recording medium.

4. The method of claim 3, wherein each of the data recorded in the predetermined amount of data blocks is buffered into the same recording unit of the buffer memory.

5. The method of claim 3, wherein the main data transferring procedure comprises:
   when detecting the start main data frame, transferring and buffering the data recorded in the start main data frame read in the meantime to a predetermined recording unit of the buffer memory; and
   transferring and buffering the data recorded in later main data frames to the recording units subsequent to the predetermined recording unit, in order to finish buffering the section of main data to the buffer memory.

6. The method of claim 5, wherein the subcode transferring procedure comprises:
   when detecting the correction main data frame, transferring and buffering the data of the subcode frame read in the meantime into the predetermined recording unit; and
   transferring and buffering the data of the later subcode frames to the recording units subsequent to the predetermined recording unit, in order to finish buffering the section of subcode into the buffer memory.

7. The method of claim 1, wherein the data recorded in the main data frames has been applied with a process of Cross Interleaved Reed-Solomon Code (CIRC).

8. The method of claim 7, wherein the additional value is determined by the latency produced by applying the process of CIRC to the main data frame.

9. The method of claim 8, wherein the determined additional value is used to make the time sequence of the subcode transferring procedure earlier than the time sequence of the main data transferring procedure, in order to compensate the CIRC latency, and make the subcode frame and the corresponding main data frame of the same data block to be transferred and buffered into the same recording unit of the buffer memory.

10. A data buffering system for buffering a section of information from an optical recording medium to a buffer memory, the optical recording medium comprising a plurality of data blocks, each data block comprising a subcode frame and a corresponding main data frame, the section of information recording in a predetermined amount of data blocks and comprising a section of main data and a section of subcode, the system comprising:
    a main data reading module for reading the data recorded in the plurality of main data frames in proper sequence;
    a subcode reading module for reading the data recorded in the plurality of subcode frames in proper sequence;
    a main target comparator for
       selecting a start main data frame of the section of main data; and
       triggering a main data transferring procedure when detecting the start main data frame;
    a correction target comparator for adding an additional value to the start main data frame, in order to get a correction main data frame for determining when a subcode transferring procedure should be triggered; and
       triggering the subcode transferring procedure when detecting the correction main data frame; and
    a transfer/buffer module for
       transferring and buffering the section of subcode to the buffer memory according to the subcode transferring procedure; and
    transferring and buffering the section of main data to the buffer memory according to the main data transferring procedure.

11. The system of claim 10, wherein the start main data frame is shown as minute/second/frame (MSF).

12. The system of claim 10, wherein the buffer memory comprises a plurality of recording units for buffering the data recorded in a data block of the optical recording medium.

13. The system of claim 12, wherein each of the data recorded in the predetermined amount of data blocks is buffered into the same recording unit of the buffer memory.

14. The system of claim 12, wherein the main data transferring procedure comprising:
    when detecting the start main data frame, transferring and buffering the data of the start main data frame read in the meantime into a predetermined recording unit of the buffer memory; and
    transferring and buffering the later data of the main data frame to the recording unit subsequent to the predetermined recording unit, in order to finish buffering the main data to the buffer memory.

15. The system of claim 14, wherein the transferring procedure of subcode comprising:
- when detecting the correction main data frame, transferring and buffering the data of the subcode frame read in the meantime into the predetermined recording unit; and
- transferring and buffering the data of the later subcode frames to the recording units subsequent to the predetermined recording unit, in order to finish buffering the section of subcode to the buffer memory.

16. The system of claim 10, wherein the data recorded in the main data frames has been applied with a process of Cross Interleaved Reed-Solomon Code (CIRC).

17. The system of claim 16, wherein the additional value is determined by the latency produced by applying the process of CIRC to the main data frame.

18. The system of claim 17, wherein the determined additional value makes the time sequence of the subcode transferring procedure earlier than the time sequence of the main data transferring procedure, in order to compensate the CIRC latency, and make the subcode frame and the corresponding main data frame of the same data block to be transferred and buffered into the same recording unit of the buffer memory.

* * * * *